No. 712,073. Patented Oct. 28, 1902.
J. A. JOYCE.
PRESS FOR MAKING BUILDING OR PAVING BLOCKS FROM PLASTIC MATERIALS.
(Application filed Nov. 19, 1901.)
(No Model.)
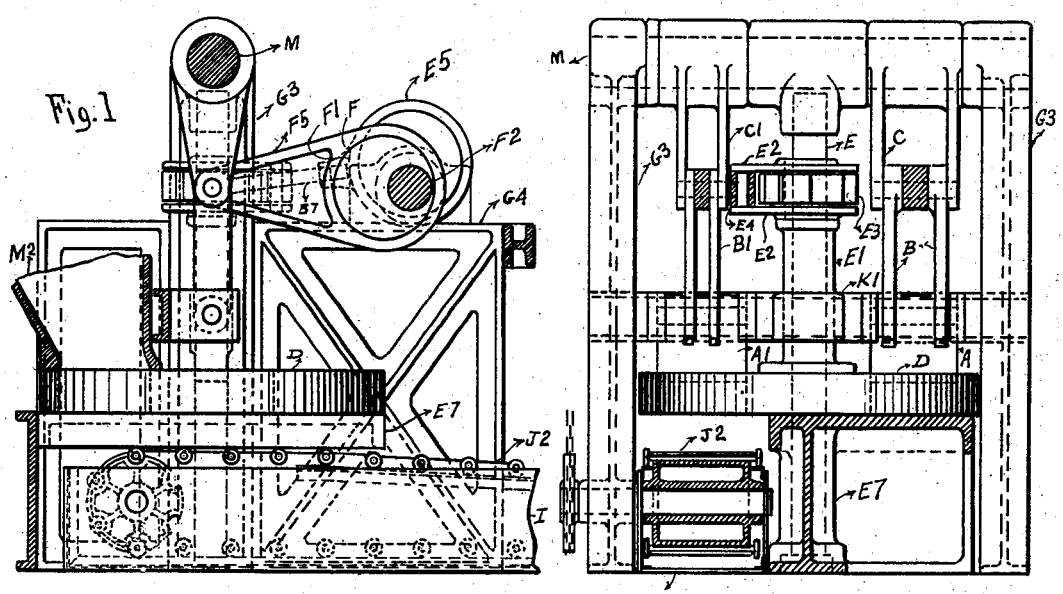
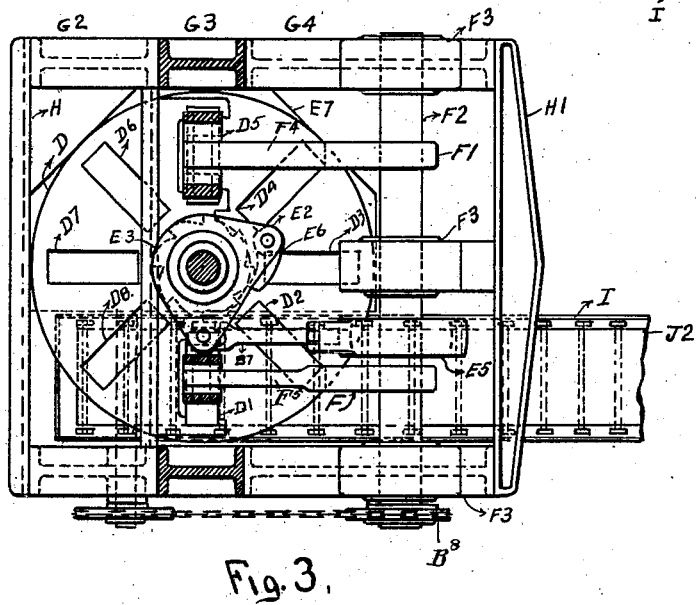
WITNESSES:
James A. Joyce INVENTOR.
BY James A. Joyce
ATTORNEY.

UNITED STATES PATENT OFFICE.

JAMES A. JOYCE, OF CLEVELAND, OHIO.

PRESS FOR MAKING BUILDING OR PAVING BLOCKS FROM PLASTIC MATERIALS.

SPECIFICATION forming part of Letters Patent No. 712,073, dated October 28, 1902.

Application filed November 19, 1901. Serial No. 82,848. (No model.)

*To all whom it may concern:*

Be it known that I, JAMES A. JOYCE, a citizen of the United States, residing at Cleveland, Cuyahoga county, State of Ohio, have invented a new and useful Improvement in Presses for Making Building or Paving Blocks from Plastic Materials, of which the following is a specification.

My invention has reference to machines for making paving or building blocks; and it consists in certain improvements in mechanism and apparatus for molding, compressing, cooling, and delivering the blocks in succession, all of which is set forth in the following specification and shown in the accompanying drawings, which form a part thereof.

The object of my invention is to provide suitable apparatus by which the successive operations specified above may be carried on continuously in successive order, producing from the soft plastic material, such as asphaltum combined, solidified, compressed, and hardened into building or paving blocks.

Figure 1 shows a side view. Fig. 2 shows an end view with parts shown in section. Fig. 3 shows a plan or top view of the machine.

Similar letters of reference indicate corresponding parts.

The material from which the blocks are to be made is delivered to the receiving-pot, the lower end of which is shown and marked $M^2$. This pot may be of any form suitable for the machine, and it may have a spiral or other form of feed to force the material into the molds in the die-disk, as will be necessary with some kinds of material; but for most cases the material will be forced in by its own weight. In cases where asphaltum is used for blocks steam-pipes may be put around the receiving-pot to keep the material soft and plastic, so as to flow into the molds freely and to completely fill the same.

The die-disk D has a plurality of holes $D'$ $D^2$, &c., forming the molds for the blocks. These holes may be of any shape or size to suit the block to be made. The die-disk is rotatively fixed on pin E and supported on table $E^7$. $E^7$ is a table-like part which forms a bottom for the molds in the die-disk, the table $E^7$ being fixed, and the die-disk D revolves on the table. The molds $D'$ $D^2$ $D^3$, &c., in the die-disk D are filled from the receiving-pot by the empty molds being revolved around until they come under the opening in the bottom of the receiving-pot. After being filled they are further revolved until they reach the pressing-plunger A. The material is pressed firmly into a block under the pressing-plunger.

The blocks are held in the molds and further revolved until they come under the pushing-out plunger $A'$. Here the blocks are pushed out on the off-bearing conveyer-belt $J^2$ and conveyed off through a bath of cold liquid, through which the conveyer-belt travels. After passing through the cold liquid the blocks are picked from the conveyer-belt and piled for use.

The shaft $F^2$ in bearings $F^3$ and driven by hand or other power applied in any suitable manner is provided with eccentrics F, $F'$, and $E^5$ and chain-sheave $B^3$, which operates the various parts of the machine, as hereinafter described.

The mechanism is so arranged that when the shaft $F^2$ is revolved the plungers A and $A'$ are raised out of the die-disk by the eccentrics F and $F'$, and while they are thus raised the eccentric $E^5$ revolves the die-disk, and in so doing an empty mold is filled and moved one-eighth of a revolution, and the one that had been previously filled is moved under the pressing-plunger A, and the block that had been previously pressed is moved under the pushing-out plunger $A'$, which forms the completed block.

To make my description more easily understood, I have put eight molds in the die-disk and lettered them $D'$ $D^2$ $D^3$, &c. This machine is arranged to have the die-disk make an eighth of a revolution to one revolution of the shaft $F^2$, thus making a block at each revolution of the shaft $F^2$. I do not wish to confine myself to this number of molds or this relation of the shaft $F^2$ to the die-disk D, as it is plainly evident that I can have any number of molds in the die-disk D. I have adopted this number to make the operation and description of the machine clear.

The eccentric $F'$ is connected to the bars

B and C, which form a toggle for pressing the blocks. The bar C has a bearing on the shaft M and is pivotally held in position and forms the upper end of the toggle. The bars C and B are pivotally connected to the eccentric-bar $F^4$, which controls the movement of the plunger A. The bars B are pivotally connected to the plunger A, which is held against all movements except the vertical, which is fully under the control of the shaft $F^2$. The plunger A is moved up and down to press the blocks into shape. The eccentric F is connected to the bars B' and C', which form a toggle for pushing the blocks out of the molds after they have been pressed. The bar C' has a bearing on the shaft M and is pivotally held in position and forms the upper fixed end of the toggle. The bars C' and B' are pivotally connected to the eccentric-bar $F^5$, which controls the movements of the pushing-out plunger A'. The bar B' is pivotally connected at the upper end to the bar C'. At the lower end the plunger A' is connected, which is held against all movements except the vertical, which is fully under the control of the shaft $F^2$.

The plunger A' is moved up and down to push the block out of the die-disk after it has been pressed by the plunger A.

The eccentric $E^5$ operates the die-disk by revolving it, so as to allow the molds to be filled, pressed into blocks, and pushed out of the molds. The eccentric $E^5$ is connected to the disk $E^2$ by rod $B^7$ through the universal joint $E^4$. These disks have a ratchet between them and a ratchet-wheel $E^3$, the ratchet-wheel being fastened to the sleeve E', and E' being fastened to the die-disk D, and the disks $E^2$ being free to move on the sleeve E'. The ratchet is held in the ratchet-wheel by a spring and so arranged that when the eccentric $E^5$ is revolved a reciprocating motion is given to the rod $B^7$, which causes the sleeve E' and the die-disk to revolve about the shaft E.

To follow the complete course of a block from plastic material to the finished block delivered to the off-bearing conveyer is as follows: The eccentric $E^5$ is connected to disk $E^2$ by the rod $B^7$. The receiving-pot is kept well filled with the material from which the blocks are to be made. The die-disk is placed so that the mold-hole D' is under the hole in the bottom of the receiving-pot. The mold D' in this position will readily fill with the material from which the blocks are to be made. The machine is started and the shaft $F^2$ is revolved and the plungers A and A' are lifted out of the disk D. While the plungers are thus raised the die-disk is revolved, so that mold $D^2$ is filled, and mold D' stands ready to be moved under the pressing-toggle at the next move. The die-disk is moved again, and the mold D' is moved under the pressing-plunger and solidly pressed into a block. This movement is continued on each successive mold until the mold D' reaches the pushing-out plunger, where it is pushed out of the die-disk, and the empty mold is again moved around until it is again filled, pressed, and pushed out, and so on with each successive mold being filled, pressed, and pushed out onto the off-bearing conveyer, where it is carried through a cooling liquid and made ready for handling.

The off-bearing conveyer $J^2$ is an endless traveling belt suitably operated within a tank I, containing a cooling liquid. The endless traveling belt is driven by a chain and chain-sheaves. This is simply to show a means of driving the belt, and it is plainly evident that many other methods may be employed to drive the belt.

The whole mechanism is shown supported by the side frames $G^2$ and $G^4$ and uprights $G^3$. The frames are connected by pieces H, H', and K', all of which are unimportant except as means of supporting the mechanism. They may be readily changed to suit the purpose for which the machine is intended.

Having fully described my invention, I claim—

1. In a block-pressing machine having a revolving disk provided with a plurality of mold-holes, and means of feeding the same, an oscillating eccentric supported upon a shaft, a ratchet and pawl acting in conjunction with said oscillating eccentric to revolve the disk, a shaft supporting pressing toggle-bars, a pressing-plunger connected to the said pressing toggle-bars, a support under the disk forming a bottom for the said mold-holes, an eccentric supported upon a shaft and acting in conjunction with the pressing-toggle to raise and lower the plunger for pressing the blocks, a shaft supporting ejecting toggle-bars, an ejecting-plunger, and an eccentric supported upon a shaft and acting in conjunction with the ejecting-plunger for ejecting the blocks from the molds, a frame supporting the various parts and mechanism for operating; substantially as shown and described.

2. In a block-pressing machine having a revolving disk provided with a plurality of mold-holes, and mechanism for feeding the same an oscillating eccentric supported upon a shaft, a ratchet and pawl acting in conjunction with said oscillating eccentric to revolve the disk, a shaft supporting pressing toggle-bars, a pressing-plunger connected to said pressing toggle-bars, a support under the disk forming a bottom for said mold-holes, an eccentric supported upon a shaft and acting in conjunction with the pressing-toggle to raise and lower the plunger for pressing the blocks, a shaft supporting ejecting toggle-bars, an ejecting-plunger, and an eccentric supported upon a shaft and acting in conjunction with the ejecting-plunger for ejecting the blocks from the molds, and an endless conveyer-belt arranged to pass under the ejecting-plunger and to receive the blocks as they are ejected from the molds and carry them through a trough of cold liquid to cool
5 them, a frame supporting the various parts and mechanism for operating, substantially as shown and described.

In testimony that I claim the foregoing as my invention I affix my signature in presence of two witnesses.

JAMES A. JOYCE.

Witnesses:
C. W. STUTE,
J. B. LARNED.